United States Patent [19]

Pivard

[11] 4,160,651
[45] Jul. 10, 1979

[54] METHODS OF TREATING A GASEOUS MIXTURE OF ADSORPTION

[75] Inventor: Claude Pivard, Paris, France

[73] Assignee: L'Air Liquide, Societe Anonyme pour l'Etude et l'Exploitation des Procedes Georges Claude, Paris, France

[21] Appl. No.: 828,546

[22] Filed: Aug. 29, 1977

[30] Foreign Application Priority Data

Sep. 7, 1976 [FR] France .................. 76 26868

[51] Int. Cl.² .................. B01D 53/04
[52] U.S. Cl. .................. 55/26; 55/62; 55/68; 55/75
[58] Field of Search .................. 55/25, 26, 62, 68, 73, 55/75

[56] References Cited

U.S. PATENT DOCUMENTS

| | | | |
|---|---|---|---|
| 3,141,748 | 7/1964 | Hoke et al. | 55/25 |
| 3,142,547 | 7/1964 | Marsh et al. | 55/26 |
| 3,564,816 | 2/1971 | Batta | 55/62 X |
| 3,636,679 | 1/1972 | Batta | 55/62 X |
| 3,717,974 | 2/1973 | Batta | 55/62 X |
| 3,720,042 | 3/1973 | Simonet | 55/25 |
| 3,738,087 | 6/1973 | McCombs | 55/62 X |
| 3,788,036 | 1/1974 | Lee et al. | 55/25 |
| 4,042,349 | 8/1977 | Baudouin et al. | 55/25 |

FOREIGN PATENT DOCUMENTS

2239277   2/1975   France .................. 55/25

Primary Examiner—Robert H. Spitzer
Attorney, Agent, or Firm—Young & Thompson

[57] ABSTRACT

This invention relates to a method of treating a gaseous mixture by adsorption making use of at least one group of three adsorbers which operate in three phases, viz. a high pressure production phase, a first adsorber regeneration phase and re-pressurization phase, and the invention consists in providing a balancing between a first adsorber and a second adsorber which precedes a balancing between said first adsorber and a buffer container: the de-pressurization which occurs in the said regeneration phase includes an additional de-pressuration which extends over the whole of the de-pressurization phase from a high production pressure to a low cleansing pressure and which takes place in the direction opposite the direction of production.

3 Claims, 5 Drawing Figures

METHODS OF TREATING A GASEOUS MIXTURE OF ADSORPTION

BACKGROUND OF THE INVENTION

The present invention relates to methods of treating a gaseous mixture or unprocessed gas by adsorption which employs the selective arrest of at least one component of the said gaseous mixture, which latter is caused to pass through an adsorber containing adsorbent granular material.

In a known form of method of this nature, use is made of three adsorbers which operate in the same cycle with a difference of phase from one to the next, the said cycle comprising:

(a) a high-pressure production phase during which a treated gas is withdrawn which results from passing the said mixture through a first adsorber in a direction termed the production direction at virtually constant pressure, (b) a phase of regenerating the first adsorber, consisting firstly of de-pressurisation from the high production pressure to a low regeneration pressure, the said de-pressurisation including two balancing operations on the one hand between the said first adsorber and a second adsorber which is beginning its re-pressurisation phase and on the other hand between the said first adsorber and a buffer container, with outfeed in the same direction as the production direction and infeed in the opposite direction, then of continuation of the de-pressurisation to the low pressure, and finally of a phase of cleansing at the said low pressure which is performed by passing through some of the gas from the said buffer container in the opposite direction from the direction of production, (c) a re-pressurisation phase, consisting of the said balancing with an adsorber at the beginning of its regeneration phase in the opposite direction from the direction of production, and of re-pressurisation to the high pressure by introducing treated gas in the opposite direction from the direction of production.

It is an object of the invention to establish a method of the kind described above which enables the following objects to be achieved;
 continuous consumption of unprocessed gas at a constant rate,
 continuous production of treated gas at a virtually constant rate,
 continuous production of residual gas at a virtually constant rate,
 production of treated gas at a pressure very close to that of the unprocessed gas,
 production of residual gas at a pressure which is possibly higher than atmospheric pressure without machinery,
 a cycle which enables gas of high purity to be obtained.

SUMMARY OF THE INVENTION

In accordance with the invention, the balancing between the said first adsorber and the said second adsorber precedes the balancing between the said first adsorber and the said buffer container, and the de-pressurisation includes an additional de-pressurisation which extends over the whole of the de-pressurisation phase from the high production pressure to the low cleansing pressure and which takes place in the opposite direction from the direction of production.

BRIEF DESCRIPTION OF THE DRAWINGS

In order that the invention may be more clearly understood, reference will now be made to the accompanying drawings, illustrative of one embodiment thereof by way of example and in which:

FIGS. 2a, 2b, 2c are diagrams of the pressures (P') in each of the three adsorbers, while

DETAILED DESCRIPTION OF A PREFERRED EMBODIMENT

Figure 1:
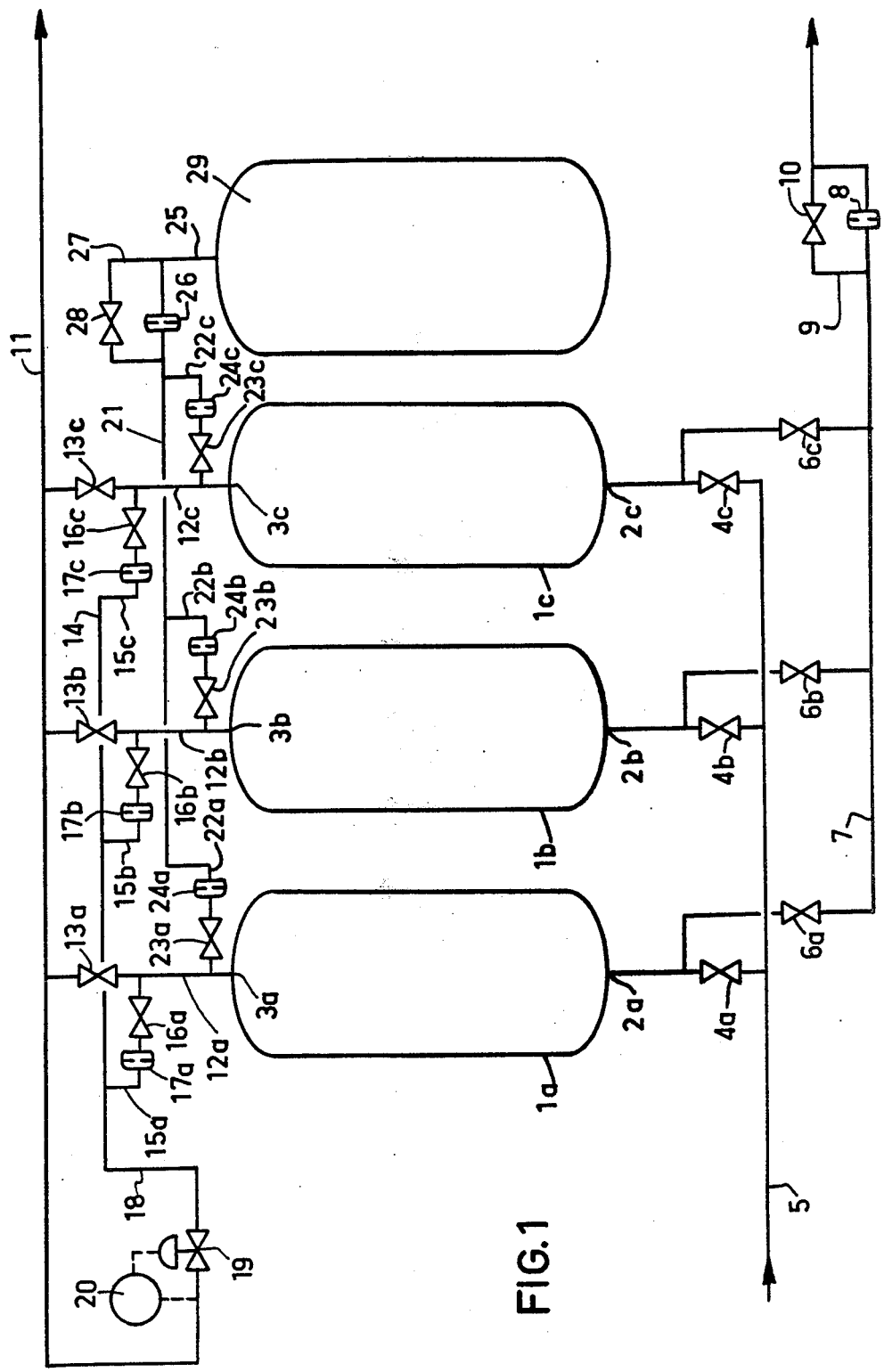
FIG. 1 is a schematic view of an installation which puts into effect the method according to the invention.
Figure 2A:
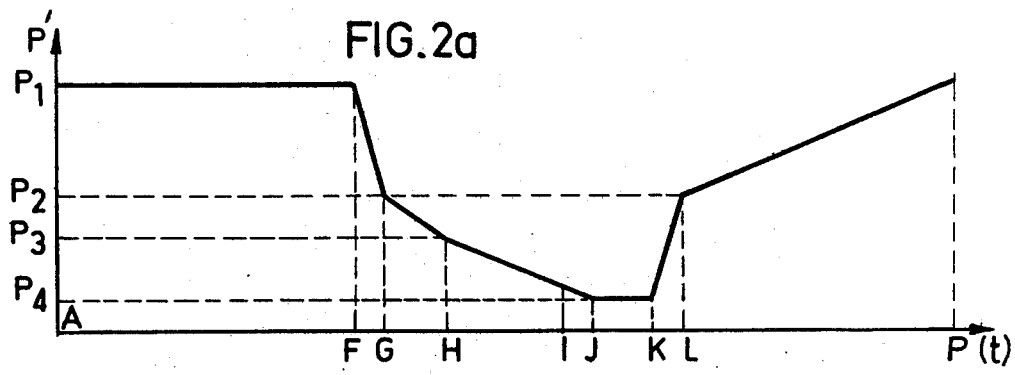
Figure 2B:
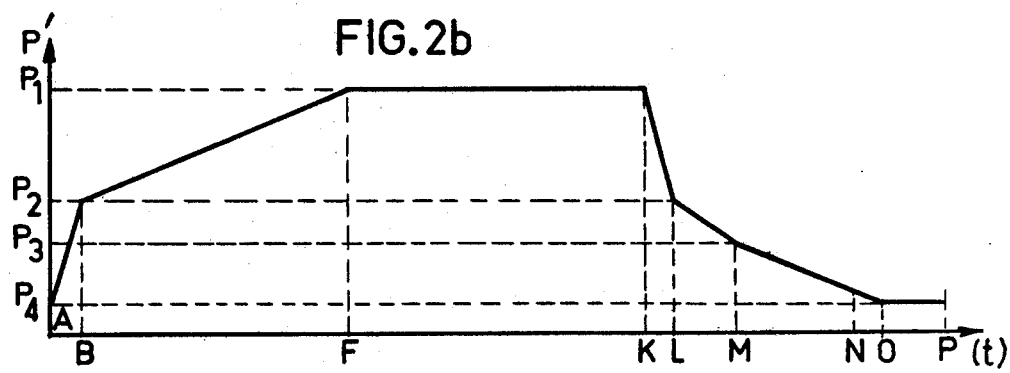
Figure 2C:
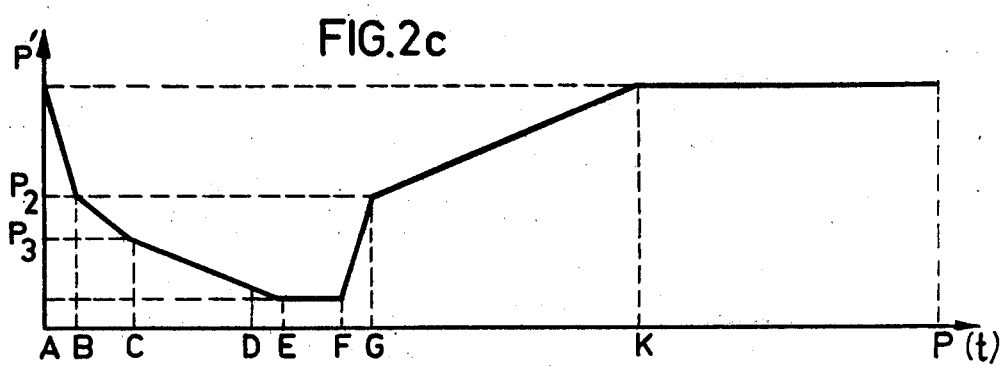
Figure 2D:
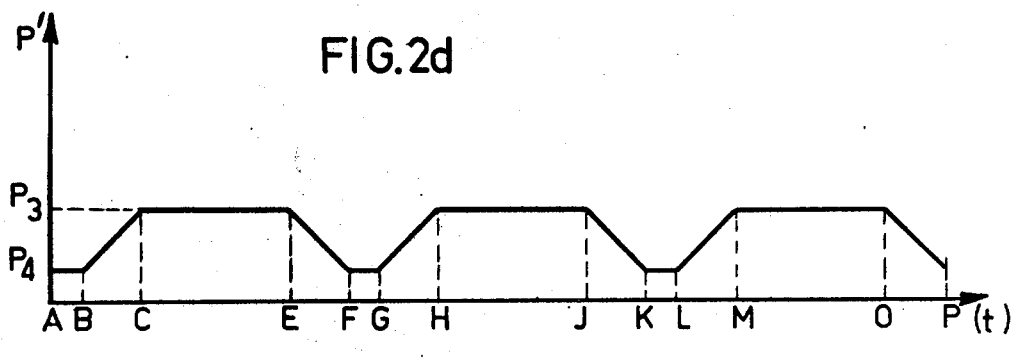
FIG. 2d shows the pressure (P') in the buffer container as a function of time (t).

Referring now to the drawings, FIG. 1 shows a treatment installation which includes three adsorbers 1a, 1b, and 1c having respective orifices 2a, 2b, and 2c termed production inlet orifices, and production outlet orifices 3a, 3b and 3c.

The production inlet orifices 2a, 2b and 2c are each connected on the one hand, by valves 4a, 4b and 4c respectively, to a feed line 5 for unprocessed gas or a gaseous mixture to be treated, and on the other hand, by valves 6a, 6b and 6c respectively, to a line 7 for residual gas which is connected via a calibrated orifice 8 (which can be bypassed by a pipe 9 containing a valve 10) to a container for residual gas or to ambient air.

Each production outlet orifice 3a, 3b, 3c is connected:
 firstly to a production line 11 by pipes 12a, 12b, 12c containing valves 13a, 13b, 13c,
 secondly to an inter-adsorber balancing line 14 by branch lines 15a, 15b, 15c which contain valves 16a, 16b, 16c and calibrated orifices 17a, 17b, 17c, the production line 11 and the balancing line 14 also being connected together by a duct 18 which contains a valve 19 controlled by a throughput regulating device 20.
 thirdly to a balancing line 21 by branch lines 22a, 22b, and 22c which contain valves 23a, 23b, 23c associated with calibrated orifices 24a, 24b, 24c. The line 21 is connected by a duct 25 incorporating a calibrated orifice 26 (which can be bypassed by a duct 27 containing a valve 28) to a buffer container 29.

Referring to FIGS. 1 and 2, the installation described operates as follows, reference first being made chiefly to the adsorber 1a.

(1) Production Phase: the unprocessed gas to be treated passes, via duct 5 and valve 4a, to the adsorber 1a, through which it passes longitudinally from the production inlet end 2a to the production outlet end 3a. A very large proportion of at least one of the components of the unprocessed gaseous mixture is arrested by the adsorbent, while the treated gas emerges at the production outlet end 3a and flows away via valve 13a to the production line 11. The unprocessed gaseous mixture to be treated is at a high pressure P1 and flows through the adsorber 1a and into the production line 11 with no great loss of pressure. This constant-pressure production phase is represented by section AF of the pressure diagram in FIG. 2a and it should be mentioned that the direction of movement of the gas in the adsorber from the production inlet 2a to the production outlet 3a is termed the production direction.

(2) Adsorbent-Regeneration Phase: this phase begins at time F and consists of a de-pressurisation phase during the period F-J, followed by a cleansing phase at a low temperature P4 during the period J-K.

The de-pressurisation phase takes place by removing gas from the adsorber 1a both via the production inlet 2a and via the production outlet 3a.

The removal of gas via the production inlet 2a, i.e., in the opposite direction from the production direction, takes place during the whole of the de-pressurisation phase F-J, the gas flowing via valve 6a into the line 7 for residual gas. From line 7 it flows to storage or to the ambient atmosphere solely via the calibrated flow-limiting orifices 8 during period F-I and then (period I-J) also, and chiefly, via valve 10, which has been opened.

The removal of gas via the production outlet 3a, i.e., in the same direction as the direction of production, takes place in two stages during a limited period F-H. In the first stage F-G, adsorber 1a is balanced with adsorber 1c via the balancing line 14 and the opened valves 16a and 16c and via the calibrated orifices 17a and 17c. At the end of this balancing (time G, balanced pressure P2), adsorber 1a is balanced with the buffer container 29 via balancing line 21, valves 23a and 28 and calibrated orifice 24a and this balancing comes to an end at time H (pressure P3).

The cleansing or purging phase takes place during the period J-K at a low pressure P4 using gas extracted from the buffer container, in which the pressure P3 (at time J) falls to P4 (at time K). This cleansing takes place via the calibrated orifice 24a, the valve 23a, and the production outlet 3a, with the cleansing gas flowing in the opposite direction from the direction of production to the production inlet 2a and thence to the line 7 for residual gas via valve 6a and to the valve 10.

(3) Re-pressurisation Phase: this phase takes place in the opposite direction to the production direction on the one hand by extracting treated gas from the production line 11 (which is of course being fed by another adsorber currently producing), via the regulated valve 19 and the re-pressurising duct 18, for the whole of the re-pressurisation phase K-P, and on the other hand, during the initial period K-L, by balancing with the adsorber 1b which is finishing its constant-pressure production, via valves 16a, 16b and calibrated orifices 15a, 15b.

Once this cycle is concluded, adsorber 1a is again at the stage of constant-pressure production described in (1) above. Each adsorber 1a, 1b, 1c goes through the same cycle with a stagger of a third of a cycle. Each of the phases of production, de-pressurisation and cleansing, and re-pressurisation is in fact of identical length.

By the means described (calibrated orifices and regulated valves), the various throughputs may be maintained at their optimum values. Thus, the phases of balancing between adsorbers or between an adsorber and the buffer container may be performed as rapidly as is permitted by the abrasion resistance of the adsorbent granular material. Similarly, the rate of removal from an adsorber in the opposite direction from that of production may be regulated to be as constant as possible by means of the calibrated orifice 8, which is bypassed at the end of depressurisation by the valve 10. Advantageously, the calibrated orifice 8 associated with the bypass duct 9 containing the valve 10 may be replaced by a constant-throughput regulator valve which provides the optimum regulation. Also, the throughput of the cleansing gas which is extracted during period J-K from buffer container 29 is controlled, by the calibrated orifice 26 or a regulated valve, in such a way that the throughput of gas leaving the adsorber during purging is as constant as possible. It is advantageous for the lengths of the de-pressurisation phase and the cleansing phase to be so selected that the throughput of gas leaving the adsorber during the de-pressurisation phase is substantially equal to the throughput of gas leaving the adsorber during the cleansing phase. Similarly, the throughput of the gas used for the re-pressurisation phase is held substantially constant during the whole of the said phase.

The invention is applicable to separating gases and in particular to separating a mixture of hydrogen (70%) and nitrogen (30%) and it enables 99.999% pure hydrogen to be obtained if a 5 Å molecular sieve is used. The same method is also applicable to the removal of other impurities from hydrogen such as argon, carbon monoxide, carbon dioxide, water, hydrogen sulphide and hydrocarbons.

The method may also be used for treating natural gas, for removing impurities contained in helium, and for separating gases, in particular oxygen from air.

I claim:

1. A method of treating a gaseous mixture by adsorption which employs the selective arrest of at least one component of said gaseous mixture, using three adsorbent beds and a buffer container, comprising performing sequentially the following cycle relating to a first bed of said beds:

(a) a high pressure phase extending over a first third of said cycle, during which a treated gas is withdrawn which results from passing the said mixture through a first adsorbent bed in a direction termed the production direction at virtually constant high production pressure, (b) a regeneration phase of said first adsorbent bed extending over a second third of said cycle consisting firstly of a de-pressurization phase from the high production pressure to a low regeneration pressure, said de-pressurization phase including two successive balancing operations firstly between said first adsorbent bed and a second adsorbent bed and secondly between said first adsorbent bed and said buffer chamber each of said balancing operations being effected with outfeed in the production direction and infeed in the opposite direction and a continuous removal of gas in the opposite direction from the production direction during the whole duration of said de-pressurization phase on one hand and finally of a cleaning phase at said low regeneration pressure which is performed by passing gas from said buffer chamber through said first adsorbent bed in the opposite direction from the direction of production, (c) a re-pressurization phase extending over a third of said cycle, consisting of a balancing between said first adsorbent bed and a third adsorbent bed which is at the beginning of its regeneration phase, in the opposite direction from the direction of production, and a continuous introducing of treated gas in the direction opposite the direction of production, extending over the whole duration of said re-pressurization phase, repeating said cycle for each of said three adsorbent beds in sequence with a stagger of a third of a cycle, introducing said mixture into said beds in sequence at a constant rate and pressure throughout said cycle, removing said treated gas from said beds in sequence at a substantially constant rate and pressure throughout said cycle, and removing from said beds in sequence, at a rate and pressure that are substantially constant throughout said cycle, gas that has passed through said beds in said opposite direction from the production direction.

2. A method of treating a gaseous mixture by adsorption according to claim 1, wherein the lengths of the de-pressurization phase and the cleaning phase are selected in such a way that the through-put of the gas leaving the adsorber during the de-pressurization phase is substantially equal to the through-put of gas leaving the adsorber during the cleaning phase.

3. A method of treating a gaseous mixture by adsorption according to claim 1, wherein the through-put of the treated gas at the high production pressure which is used for re-pressurization is maintained substantially constant during the whole of the re-pressurization phase.

* * * * *